Oct. 16, 1928.
C. W. THOMPSON
1,687,527
SHOCK ABSORBER
Filed July 25, 1924
2 Sheets-Sheet 1
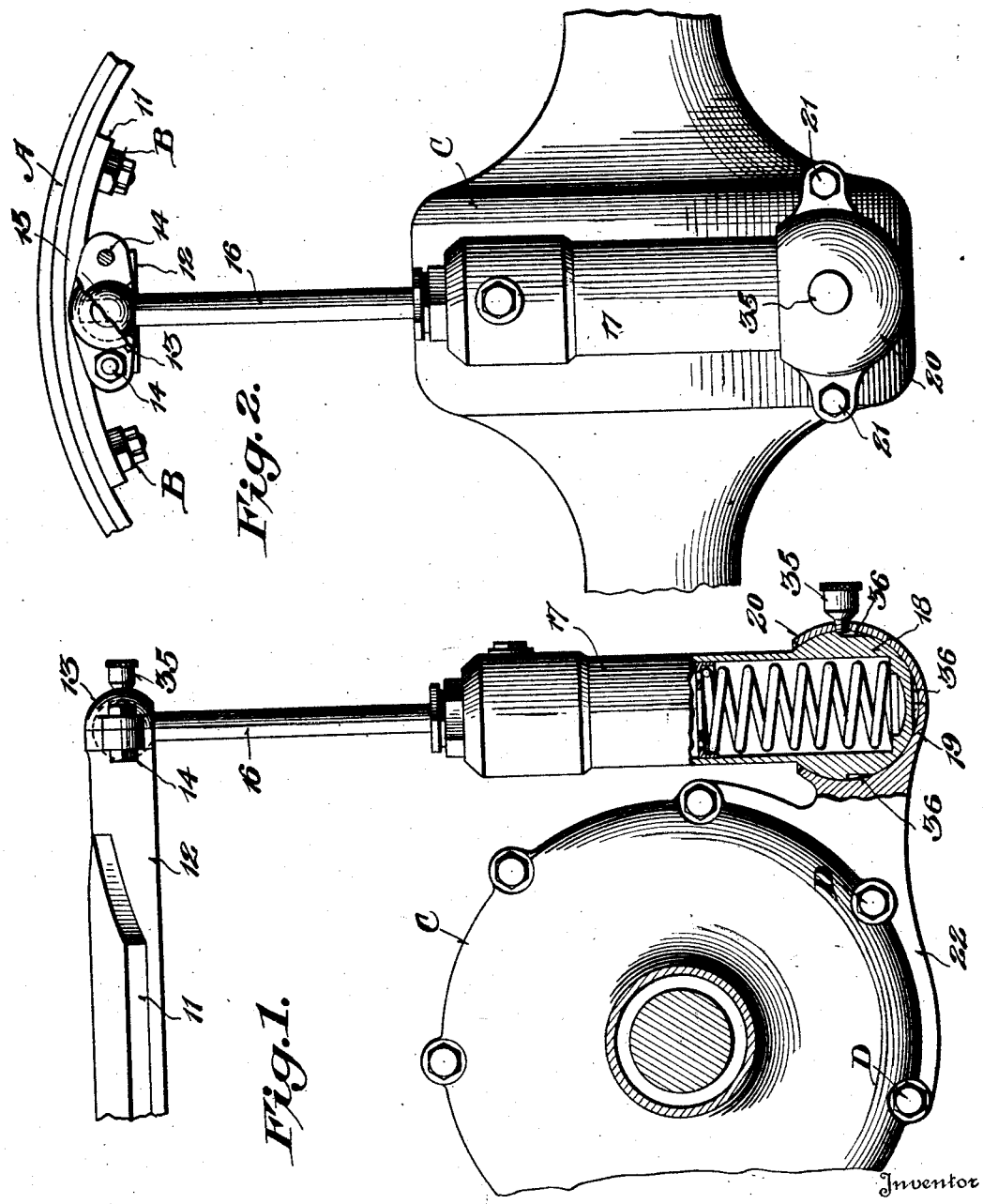

Oct. 16, 1928.
C. W. THOMPSON
1,687,527
SHOCK ABSORBER
Filed July 25, 1924     2 Sheets-Sheet 2
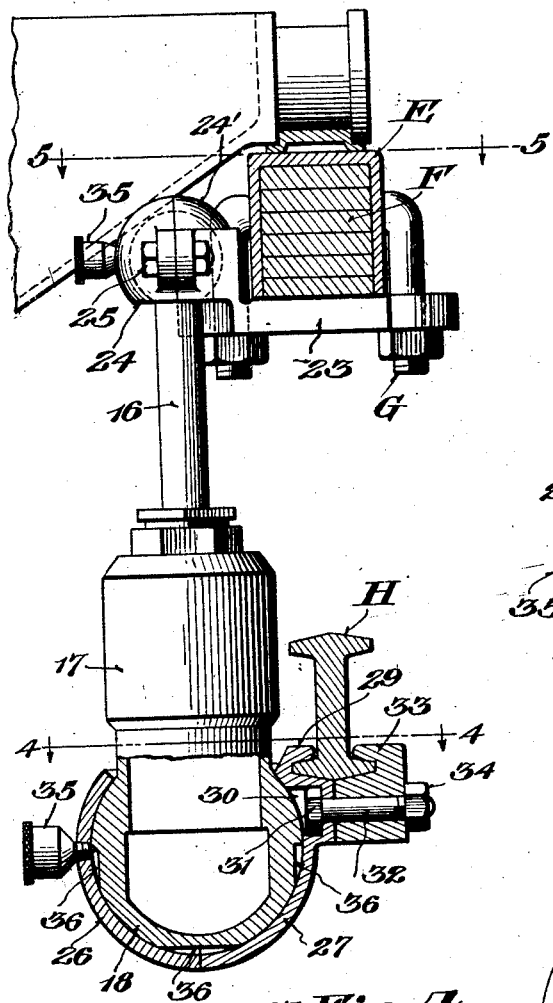
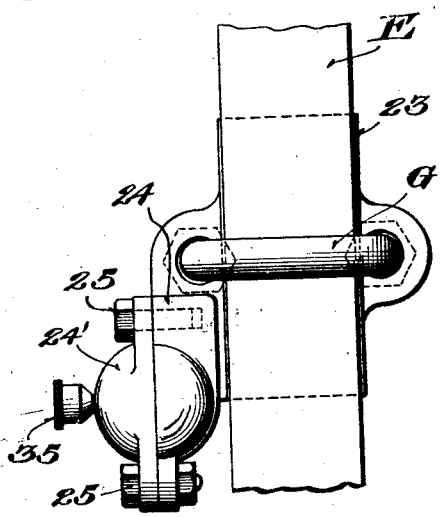
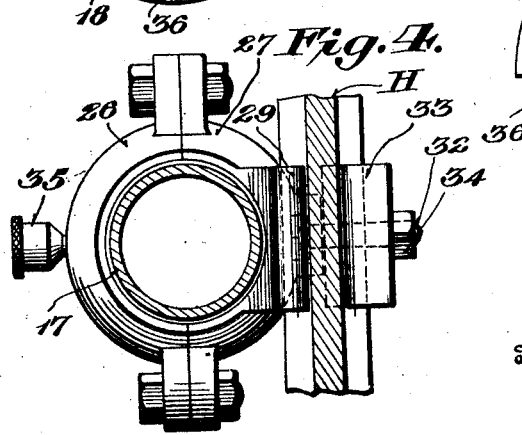
Inventor
Clarence W. Thompson,
By H. Ralph Burton,
Attorney Patented Oct. 16, 1928.

1,687,527

UNITED STATES PATENT OFFICE.

CLARANCE W. THOMPSON, OF WILMINGTON, DELAWARE, ASSIGNOR TO THOMPSON SPRING CORPORATION, OF WILMINGTON, DELAWARE, A CORPORATION OF DELAWARE.

SHOCK ABSORBER.

Application filed July 25, 1924. Serial No 728,197.

This invention relates to the installation of shock-absorbers and the like in vehicles.

It is an object of the invention so to connect devices of this sort with relatively movable parts that free movement thereof in directions other than those for which the devices are intended to offer restraint is not interfered with by them, whereby binding of the parts is avoided.

Another object of the invention is to provide a ball-and-socket connection that includes a ball that is an integral part of the casing of the restraining device, in order to reduce the length of space occupied by such a device between parts of a vehicle, as between the body and axle for example.

It also is an object of the invention to provide couplings of novel formation for connection of a shock-absorber or the like with body and axle parts of a vehicle.

When considered in connection with the description herein, the characteristics of the invention are apparent from the accompanying drawings, forming part hereof, wherein adaptations of the invention to a motor-vehicle are disclosed, for purposes of illustration.

Although the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 1 is a side elevation of a rear installation, certain parts being shown in section;

Fig. 2 is a rear elevation thereof;

Fig. 3 is a side elevation of a front installation, certain parts being shown in section;

Fig. 4 is a section on the line 4—4, Fig. 3;

Fig. 5 is a section on the line 5—5, Fig. 3;

Fig. 6 is an exterior view of the casing of a shock-absorber.

In the drawings, which for purposes of exemplification disclose installations in a motor-vehicle in which there are transversely-disposed springs, A designates a rear spring secured by clips or fastening members B to the body, C the differential-housing of the rear axle structure having its parts held together by bolts D, E a transverse yoke or other body member at the front, F a front spring held to the yoke by clip or the like G, and H the front axle in the form of an I beam.

As one of the elements of the rear installation of a shock-absorber or the like, a member 11, arcuate transversely to conform approximately to the contour of the spring A, is secured to the under side thereof in any suitable manner, as by the clips or fastening members B. This member includes a rearwardly-extending arm 12. The arm has on its free end a closing member 13 removably secured thereto by bolts 14. A substantially spherical socket is located in the arm and that member, and a ball 15 of a piston-rod 16 is disposed in the socket.

The piston-rod extends into a casing 17 of a shock-absorber or the like, in the chamber of which it is associated with any suitable means for resisting its movement. The exterior of the casing at its lower end is formed integrally of its wall with a ball 18 into which the chamber extends. Thus the ball is coextensive with the lower end portion of the casing and of the chamber therein.

The ball 18 is disposed in a substantially spherical socket of a fitting 19, having a closing member 20 removably held thereon by bolts 21 and operating to retain the ball in the socket. The fitting 19 in its forward portion 22 is of arcuate shape and conforms to the contour of and abuts against the periphery of the housing C, and it is secured thereto in any suitable manner, as by bolts D.

In view of the fact that the ball 18 is coextensive with the lower end portion of the casing 17 and the chamber extends thereinto, the length of the shock-absorber from the lower end of the casing to the upper end of the piston-rod is less than when the lower end of the device is connected below the end of the casing, as by a ball on that end beyond the end of the chamber. This enables the device to be installed in association with parts relatively close together, and that is a condition that is met particularly in the front end of a vehicle having a transversely-disposed spring.

In such a case, the spring usually is housed at its crown in a channel transverse member E and held therein by clips G. These clips are employed to hold a member 23 against the bottom of the channel member. The member 23 is formed with a half portion 24 of a socket-casing, and the other half portion thereof is a closing member 24' removably secured by bolts 25.

This socket houses a ball 15 of a piston-rod 16, which extends into a casing 17 formed with a ball 18 at its lower end in a manner similar to the rear installation.

The ball in this case is disposed in a substantially spherical socket in a casing formed of two parts 26 and 27 removably held together by bolts 28. A clip part or jaw 29 is formed integrally with the socket part 27, and below it the latter part has a seat 30 open to its interior arranged to accommodate the head 31 of a bolt and an opening to permit a bolt-shank 32 to be disposed therethrough. That shank extends through a relatively movable clip part or jaw 33, which is drawn toward the opposite jaw 29 by a nut 34 on the bolt. The jaws are arranged to clamp over the lower flange of the I-shaped axle H and against opposite sides thereof and thus hold the socket-casing on the axle.

The ball-and-socket installation of a shock-absorber or similar device in the manner described permits free relative swaying movement of the body and axles without interference with the functioning of the device, and the making of the casing-ball coextensive with the lower portion of the casing permits installation of the device between parts close together.

The sockets preferably are equipped with lubricant-cups 35. In order to permit the lubricant to pass freely around the balls, the latter may be flattened circumferentially to afford passageways or ducts 36.

Having thus described my invention, what I claim as new, and desire to secure by Letters Patent, is—

1. A movement-restraining device for motor-vehicles comprising a casing having an end portion of substantially spherical contour arranged to be disposed in a socket of a fitting, said casing containing a chamber of substantially uniform transverse dimension extending throughout the major portion of its length and into said substantially spherical end portion, and a member reciprocable in said chamber arranged to be connected with another fitting.

2. In a motor-vehicle, the combination, with the body and axle structure of the vehicle, of fittings, having sockets, secured to said body and axle structure, a movement-restraining device comprising a casing having an end portion of substantially spherical contour disposed in the socket of one of said fittings, said casing containing a chamber of substantially uniform transverse dimension extending throughout the major portion of its length and into said substantially spherical end portion, and a member, extending into and reciprocable in said chamber, having a ball on its outer portion disposed in the socket of the other of said fittings.

In testimony whereof I affix my signature this 3d day of July, 1924.

CLARANCE W. THOMPSON.